United States Patent
Matsuyama

(10) Patent No.: US 8,465,360 B2
(45) Date of Patent: Jun. 18, 2013

(54) SHOOTING GAME DEVICE

(75) Inventor: Shigenobu Matsuyama, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1236 days.

(21) Appl. No.: 10/592,498

(22) PCT Filed: Mar. 1, 2005

(86) PCT No.: PCT/JP2005/003377
§ 371 (c)(1),
(2), (4) Date: Sep. 12, 2006

(87) PCT Pub. No.: WO2005/087334
PCT Pub. Date: Sep. 22, 2005

(65) Prior Publication Data
US 2007/0202946 A1    Aug. 30, 2007

(30) Foreign Application Priority Data
Mar. 12, 2004   (JP) ................................ 2004-070265

(51) Int. Cl.
*A63F 13/00* (2006.01)
(52) U.S. Cl.
USPC ................................... 463/23; 463/2; 463/46
(58) Field of Classification Search
USPC ........................................ 463/6, 23
See application file for complete search history.

(56) References Cited

U.S. PATENT DOCUMENTS

| | | | |
|---|---|---|---|
| 5,435,553 A * | 7/1995 | Arima et al. ..................... | 463/6 |
| 6,379,249 B1 * | 4/2002 | Satsukawa et al. ............. | 463/31 |
| 6,419,580 B1 * | 7/2002 | Ito ................................... | 463/31 |
| 6,913,536 B2 * | 7/2005 | Tomizawa et al. .............. | 463/43 |
| 7,367,882 B2 * | 5/2008 | Fukutome ........................ | 463/7 |

FOREIGN PATENT DOCUMENTS

| | | |
|---|---|---|
| JP | 6-277361 A | 10/1994 |
| JP | 3269797 B2 | 1/2002 |
| JP | 2003-208263 A | 7/2003 |

OTHER PUBLICATIONS giantbomb.com, rubberband AI.*
House of the Dead II, Wikipedia article.*
House of the dead 2 wikipedia article (game released 1998).*
giantbomb.com article (published 2008, reference to games dating from 1983-2008).*

* cited by examiner

*Primary Examiner* — Melba Bumgarner
*Assistant Examiner* — Thomas H Henry
(74) *Attorney, Agent, or Firm* — Sughrue Mion, PLLC

(57) ABSTRACT

In a shooting game device capable of having more than one player play a game, stop control module (M1), generates first stop information (ST1) upon detecting that a first gun unit (30) points out of the screen, and generates second stop information (ST2) upon detecting that a first gun unit (40) points out of the screen. A virtual view position movement module (M2) moves a first virtual view position for a first player and a second virtual view position for a second player at the predetermined speed, but stops the movement of the first virtual view position upon detecting first stop information (ST1) and stops the movement of the second virtual view position upon detecting second stop information (ST2). An image generation module (M4) generates a first image (GD1) for the first player and a second image (GD2) for the second player in a virtual space based on first position information (PS1) showing the first virtual view position and second position information (PS2) showing the second virtual view position.

9 Claims, 13 Drawing Sheets

FIG. 10

| d: DISTANCE | DIFFICULTY LEVEL PARAMETER ||||||||
| --- | --- | --- | --- | --- | --- | --- | --- | --- |
| | PRM1: EMERGENCE NUMBER PARAMETER || PRM2: ATTACK NUMBER PARAMETER || PRM3: HIT PROBABILITY PARAMETER || PRM4: HIT AREA PARAMETER ||
| | FOR 1ST PLAYER | FOR 2ND PLAYER | FOR 1ST PLAYER | FOR 2ND PLAYER | FOR 1ST PLAYER | FOR 2ND PLAYER | FOR 1ST PLAYER | FOR 2ND PLAYER |
| d>k1 | A1 | A6 | B1 | B6 | C1 | C6 | D1 | D6 |
| k1≧d>k2 | A2 | A5 | B2 | B5 | C2 | C5 | D2 | D5 |
| k2≧d>0 | A3 | A4 | B3 | B4 | C3 | C4 | D3 | D4 |
| d=0 | Aref | Aref | Bref | Bref | Cref | Cref | Dref | Dref |
| 0>d≧-k2 | A4 | A3 | B4 | B3 | C4 | C3 | D4 | D3 |
| -k2>d≧-k1 | A5 | A2 | B5 | B2 | C5 | C2 | D5 | D2 |
| -k1>d | A6 | A1 | B6 | B1 | C6 | C1 | D6 | D1 |

TBL

SHOOTING GAME DEVICE

TECHNICAL FIELD

The present invention relates to a shooting game device.

BACKGROUND ART

A device for a shooting game where a player participates in a firefight against enemies displayed on a screen is publicly known. Such a shooting game device causes a player's virtual view position to move to a predetermined fighting point along a path defined in a virtual space and to stop. Enemies appear at the fighting point and engage in a firefight with a player. If the player eliminates the enemy, a player's virtual view position is moved to a next fighting point and a firefight is performed again. These processes are repeated, and scores given on the basis of a player's shooting ability are displayed.

Further, in a shooting game device for use by two players, there is disclosed in Japanese Patent Laid-Open Publication 3269797 (hereinafter, JP 3269797) a technique for displaying an image of a virtual space from each player's virtual view position and controlling each player's virtual view position in accordance with game achievements. This publication further discloses that the enemy is moved to enter a player's view in a predetermined case.

In a shooting game system using a virtual space, it is an important game element to reflect a player's intention in content of the game because, by doing so, a player is given a more realistic feeling of a virtual experience. However, the shooting game device disclosed in JP 3269797 automatically switches a player's virtual view position in accordance with game achievements, and, therefore, a player's virtual view position is automatically controlled by the game device. Further, the shooting game device moves a player's virtual view position to a fighting point, and fixes the player's virtual view position at the fighting point, but this feature is the same as a publicly known game shooting device. Thus, no player's intention is reflected with respect to the movement of his/her virtual view position.

Further, in a shooting game device for two players, a player who takes the lead in a virtual space meets the enemy before a following player does. In this case, a leading player has a higher possibility of defeating more enemies, but s/he also has a higher possibility of receiving damages by attacks from enemies. Conversely, a following player has less possibility of being attacked by enemies, but s/he also has less possibility of defeating enemies. Thus, a leading player is high-risk, high-return, and a following player is low-risk, low-return. However, in a conventional game shooting device, to play as a leading or a following player is automatically determined on the basis of game achievements. As a result, a player is not allowed to engage in any tactics such as intentionally giving the lead to the other player depending on emergences of enemies and a number of the remaining bullets.

DISCLOSURE OF INVENTION

The present invention has been made in view of problems stated above, and provides a shooting game device which reflects a player's intention in moving a virtual view position.

In the following, a description will be given of the present invention. It is to be noted that reference numbers in the attached figures are shown in parenthesis, not to limit the present invention to embodiments shown in the figure but to promote understanding of the present invention.

A shooting game device according to the present invention generates an image of attacking enemies emerging in a defined path and of defending against attacks from said enemies in a virtual space, and said shooting game device comprises: a first input unit (30) for a first player that outputs first operation information (D1) in accordance with an operation of the first player; a second input unit (40) for a second player that outputs second operation information (D2) in accordance with an operation of the second player; a virtual view position mover (M22) that continuously moves, from a start point to an end point of said path, a first virtual view position of a first player and a second virtual view position of a second player, to generate first position information (PS1) showing said first virtual view position and second position information (PS2) showing said second virtual view position; an image generator (M4) that generates, based on said first position information (PS1), a first image (GD1) at said first virtual view position in the virtual space, for display on a first display screen for said first player, and that generates, based on said second position information (PS2), a second image (GD2) at said second virtual view position in the virtual space, for display on a second display screen for said second player; a first stopper (M1) that generates first stop information (ST1) when said first operation information (D1) indicates a predetermined operation; a second stopper (M1) that generates second stop information (ST2) when said second operation information (D2) indicates a predetermined operation; a first image controller (M31) that, upon detecting said first stop information (ST1), controls said virtual view position mover (M22) to stop movement of said first virtual view position and that controls said image generator (M4) to generate said first image (SD1) including an image of defending from said enemies; and a second image controller (M32) that, upon detecting said second stop information (ST2), controls said virtual view position mover (M22) to stop movement of said second virtual view position and that controls said image generator (M4) to generate said second image (GD2) including an image of defending against said enemies.

According to this aspect, the virtual view position mover continuously moves the first virtual view position and the second view position unless stop information is detected; the movement of the first virtual view position is stopped by the first stop information, and the movement of the second virtual view position is stopped by the second stop information. In other words, the first virtual view position and the second view position are controlled independently from each other. The first stop information is generated based on an operation of the first player, and the second stop information is generated based on an operation of the second player. Thus, the determination as to whether to stop the movement of a virtual view position is left to the player's will and is not automatically made by the game device. In a shooting game device, players compete for scores by shooting enemies emerging in a virtual space while protecting themselves from the enemies. Since a player who takes the lead (a leading player) in a virtual space encounters a large number of enemies, s/he has a possibility of obtaining high scores but is also subject to attacks from enemies. A following player is safer, but is hard to obtain scores. Thus, the leading player is high-risk, high-return, and the following player is low-risk, low-return. This invention allows a player to consider such an interest, advantages and disadvantages in addition to the proceedings of the game, to determine whether to take a lead or to follow. In other words, not simply defeating immediate enemies but also bargaining with other players can be introduced as a game element.

The virtual view position mover may comprise a first virtual view position mover that manages the movement of the first virtual view position and a second virtual view position mover that manages the second virtual view position. The image generator may comprise a first image generator that generates a first image and a second image generator that generates a second image.

In another aspect, the shooting game device (A) may further comprise: a difficulty level specifier (11) that specifies difficulty level parameters (PRM) specifying levels of difficulty of a game; and a difficulty level adjuster (TBL) that adjusts said difficulty level parameters based on said first position information (PS1) and said second position information (PS2) so that a difficulty level (PRM) of a following player is set lower than a difficulty level (PRM) of a leading player. The higher the difficulty level is, the more difficult it becomes to clear a game or to advance to a next stage of the game. According to this aspect of the invention, the difficulty level of a game can be changed, within a single game, depending on whether a player is a leader or a follower in a virtual space. The difficulty level for the following player can be lowered, so chances are given even to a player who is less capable in skills of gaming.

In still another aspect, in the shooting game device (A), said difficulty level adjuster (TBL) may adjust said difficulty level parameter (PRM) of said leading player depending on a distance between a first virtual view position and a second virtual view position in the virtual space obtained from said first position information (PS1) and said second position information (PS2). According to this aspect, difficulty levels can be adjusted depending on a distance between a first virtual view position and a second virtual view position. In this case, difficulty levels can be continuously or stepwisely adjusted.

In still yet another aspect, in the shooting game device (A), said difficulty level parameters (PRM) may include an emergence number parameter (PRM1) specifying a number of times of emergences of said enemies; said difficulty level adjuster (TBL) may adjust said emergence number parameter (PRM1) so that a number of emergences of said enemies for a following player is smaller than a number of emergences of said enemies for a leading player; said first image controller (M31) may control said image generator (M4) to refer to said emergence number parameter (PRM1) for said first player and generate said first image (GD1) containing an enemy image for said first player; and said second image controller (M32) may control said image generator (M4) to refer to said emergence number parameter (PRM1) for said second player and generate said second image (GD2) containing an enemy image for said second player. According to this aspect, since a number of emergences of enemies is set small for a following player, the player can let his/her character to advance by easily shooting enemies without stopping. As a result, the following player can catch up with a leading player, and therefore, it is possible to produce a close battle in which the lead is changed between the players for many times.

In one aspect, in the shooting game device (A), said difficulty level parameters (PRM) may include an attack number parameter (PRM2) specifying a number of times of attacks from said enemies; said difficulty level adjuster (TBL) may adjust said attack number parameter (PRM2) so that a number of attacks from said enemies for a following player is smaller than a number of attacks from said enemies for a leading player; said first image controller (M31) may control said image generator (M4) to refer to said attack number parameter (PRM2) for said first player and generate said first image (GD1) containing an attack image from enemies for said first player; and said second image controller (M32) may control said image generator (M4) to refer to said attack number parameter (PRM2) for said second player and generate said second image (GD2) containing an attack image from enemies for said second player. According to this aspect, since a number of attacks from enemies is set small for a following player, the player can let his/her character to advance by easily shooting enemies without stopping. As a result, the following player can catch up with a leading player, and therefore, it is possible to produce a close battle in which the lead is changed between the players for many times.

In another aspect, in the shooting game device (A), said difficulty level parameters (PRM) may include a hit probability parameter (PRM3) specifying a probability of being shot in attacks from said enemies; said difficulty level adjuster (TBL) may adjust said hit probability parameter (PRM3) so that a hit probability of attacks from said enemies for said following player is smaller than a hit probability of attacks from said enemies for said leading player; said first image controller (M31) may control said image generator (M4) to refer to said hit probability parameter (PRM3) for said first player to generate said first image (GD1) containing a damage image of said first player resulting from attacks from enemies; and said second image controller (M32) may control said image generator (M4) to refer to said hit probability parameter (PRM3) for said second player to generate said second image (GD2) containing a damage image of said second player resulting from attacks from enemies. According to this aspect, a hit probability of attacks from enemies is set small for a following player, the player can let his/her character to advance by easily shooting enemies without stopping. As a result, the following player can catch up with a leading player, and therefore, it is possible to produce a close battle in which the lead is changed between the players for many times. The damage image can be a demonstration image of being killed in the line of duty.

In still another aspect, in the shooting game device (A), said difficulty level parameters (PRM) may include a hit area parameter (PRM4) specifying a size of a hit area assigned to said enemies for attacks from players; said difficulty level adjuster (TBL) may adjust said hit area parameter (PRM4) so that a hit area assigned to said enemies for attacks from said following player is larger than a hit area assigned to said enemies for attacks from said leading player; said shooting game device may further comprise: a bullet landing position calculator (11) that calculates a landing position of a bullet on the basis of said first operation information (D1) and said second operation information (D2); a first hit determiner (11) that refers to said hit area parameter (PRM4) for said first player, to specify a hit area of said enemies for the first player, and that determines whether said landing position for said first player falls in said hit area; and a second hit determiner (11) that refers to said hit area parameter (PRM4) for said second player, to specify a hit area of said enemies for the second player, and that determines whether said landing position for said second player falls in said hit area; said first image controller (M31) may control said image generator (M4) to refer to a determination result of said first hit determiner (11) to generate said first image (GD1) containing an image of said enemies for said first player being shot; and said second image controller (M32) may control said image generator (M4) to refer to a determination result of said second hit determiner (11) to generate said second image (GD2) containing an image of said enemies for said second player being shot. According to this aspect, since a hit area for attacks to enemies is set large for a following player, it is easy to shoot enemies. Thus, the player can let his/her character to advance by easily shooting enemies without stopping. As a result, the following player can catch up with a leading player, and therefore, it is possible to produce a close battle in which the lead is changed between the players for many times.

In still yet another aspect, the shooting game device (A) may further comprise a virtual view position controller (11) that controls said virtual view position mover (M22), based on said first position information (PS1) and said second position information (PS2), so that a moving speed of a virtual view position for the following player is faster than a moving speed of a virtual view position for the leading player. According to this aspect, since a moving speed of a virtual view position for a following player is made faster, the following player can easily overtake the leading player, and therefore, it is possible to produce a close battle in which the lead is changed between the players for many times.

EFFECTS OF THE INVENTION

As described above, according to the present invention, the determination as to whether to advance or to stop a virtual view point can be made according to a player's intention, depending on the proceedings of the game such as actions of the other player and emergences of enemies.

BRIEF DESCRIPTION OF DRAWINGS

FIG. 10 is an explanatory diagram showing an example of details of a difficulty level table used in the shooting game device.

BEST MODE FOR CARRYING OUT THE INVENTION

Figure 1:
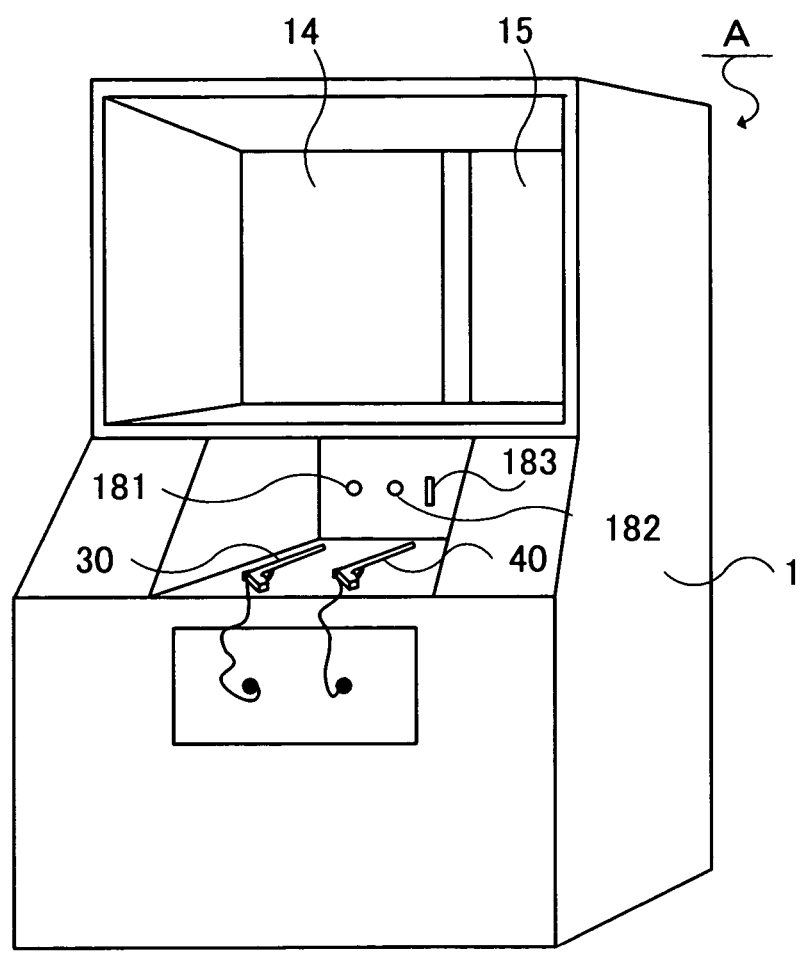
FIG. 1 is a perspective view showing an external view of a shooting game device according to an embodiment of the present invention.

FIG. 1 shows an external view of a shooting game device "A" according to the present invention. As shown in the figure, in an upper part of a body 1, there are provided a first display device 14 and a second display device 15 next to each other. First display device 14 displays an image for a first player and second display device 15 displays an image for a second player. A pair of a screen and a projector or a monitor can be used as first and second display device 14 and 15. It is also possible to configure first display device 14 and second display device 15 as a single display device and split the display device into a display area for a first player and a display area for a second player.

A first gun unit 30 for a first player and a second gun unit 40 for a second player respectively are connected to body 1 via a cable. Each of first and second gun units 30 and 40 has a trigger for a player to input a gunshot operation of a bullet, an option button, and a CCD camera. First and second gun units 30 and 40 function as input units that output a signal according to a player's operation.

Figure 2:
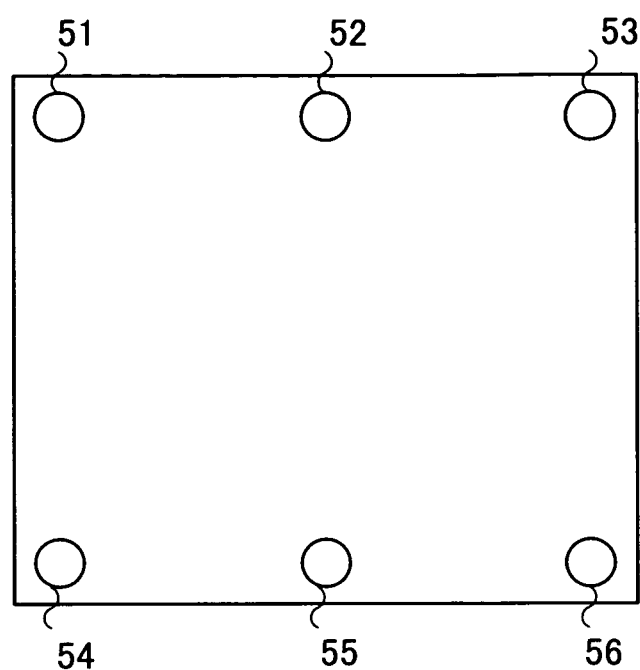
FIG. 2 is an explanatory diagram showing positions of light-emitting diodes located on screens of first and second display devices of the shooting game device.

There are provided in a middle portion of body 1, a start switch 181 for single-player game, and a start switch 182 for a two-player game, and a coin slot 183. Further, as shown in FIG. 2, there are provided, on each screen of first and second display devices 14 and 15, six light emitting diodes 51-56 emitting infra-red rays.

Figure 3:
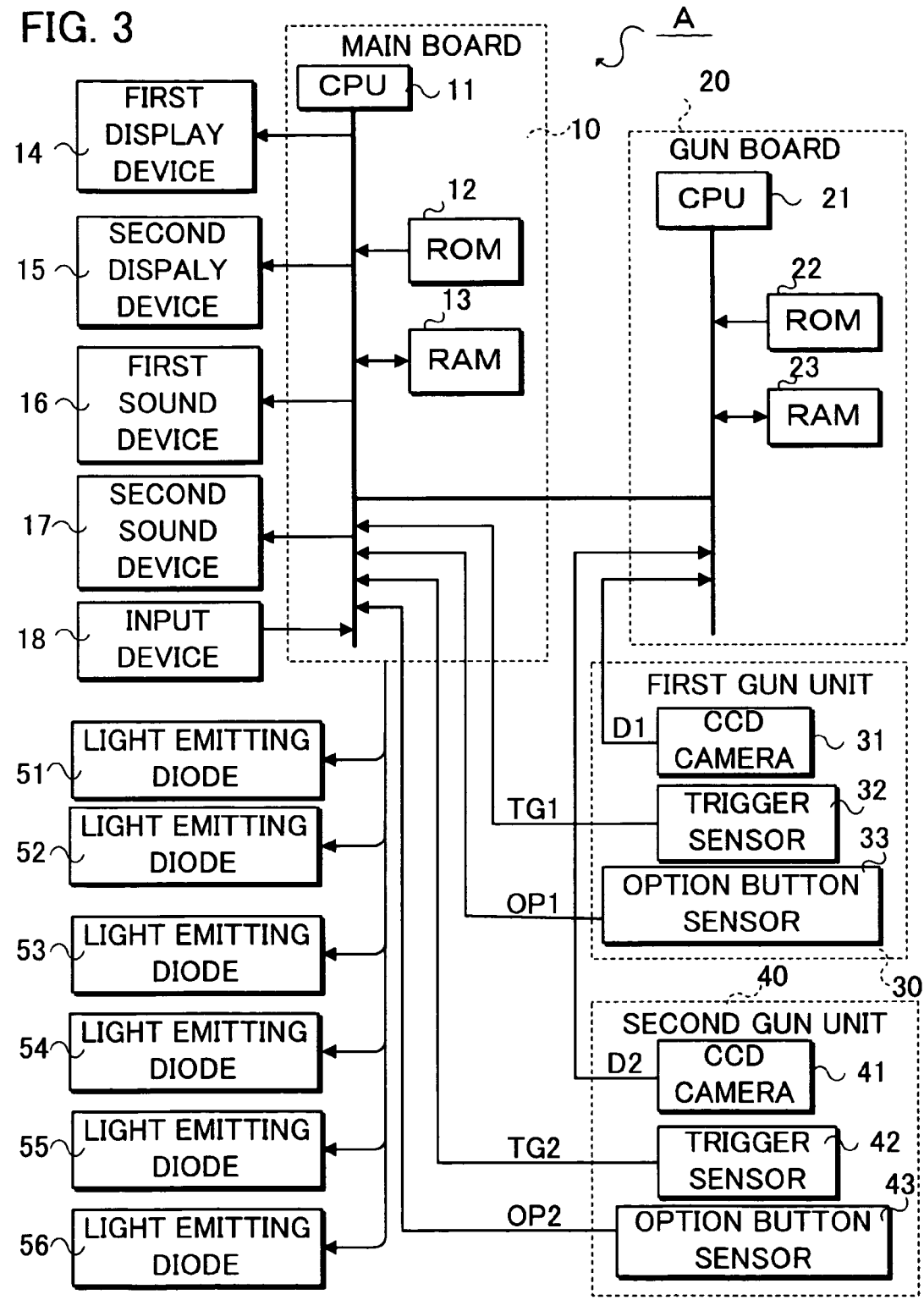
FIG. 3 is a block diagram showing an electric configuration of the shooting game device.

FIG. 3 is a block diagram showing an electric configuration of shooting game device "A". Shooting game device "A" has a main board 10 and a gun board 20. A CPU 11 of main board 10 is connected with ROM 12 and RAM 12 through a bus. CPU 11 executes a game program stored in ROM 12, to thereby function as a control center of shooting game device "A". RAM 13 functions as a work area for CPU 11 and stores data under process. A recording device such as a hard disk device or a DVD player having stored image data or voice data may be connected to the bus so that a large amount of data is read.

In addition to first display device 14 and second display device 15, there are connected to main board 10 a first sound device 16 for a first player and a second sound device 17 for a second player. Each of first and second sound devices 16 and 17 has an amplifier and a speaker. Speakers are placed on left and right portions of body 1, respectively. First and second players, therefore, can hear sound effects for his/her own play at a larger volume. Further connected to main board 10 is an input device 18, and CPU 31 detects a signal from input device 18, for example, to start a game. Input device 18 includes the above stated start button 181 and 182, and a sensor for detecting a coin inserted through the slot 183. Further, main board 10 supplies light emitting diodes 51-56 with power supply voltages.

First gun unit 30 is provided with a CCD camera 31, a trigger sensor 32, and an option button sensor 33. CCD camera 31 is provided inside a gun barrel first gun unit, and capable of capturing images through a mouth of the gun. Provided in a front portion of CCD camera 31 is an infra-red transparent filter. CCD camera 31 can therefore generate an image corresponding to infra-red rays emitted from the above light emitting diodes 51-56. CCD camera 31 binarizes image signals and outputs first image data D1 as binary data. When a first player holds first gun unit 30 pointing to the screen, positions of the 6 light emitting diodes 51-56 in a captured image change depending on a direction of the gun barrel. In other words, first image data D1 is information corresponding to an operation of a first player. First gun unit 30 is further provided with a trigger sensor 32 and an option button sensor 33. Trigger sensor 32, upon detecting that a trigger of first gun unit 30 is pulled, outputs a trigger signal TG1. Further, option button sensor 32, upon detecting that an option button is pressed down, outputs an option signal OP1. The option button can be used, for example, for switching a weapon. Trigger signal TG 1 and option signal OP1, as well as first image data D1, are information corresponding to operations of a first player.

Second gun unit 40, similarly to first gun unit 30, is provided with a CCD camera 41 that outputs second image data D2, a trigger sensor 42 that outputs a trigger signal TG2, and an option button sensor 43 that outputs an option signal OP2. The trigger signals TG1 and TG2, and option signals OP1 and OP2 are supplied through an interface (not shown) to a bus of main board 10. On the other hand, first and second image data D1 and D2 are supplied to gun board 20.

Figure 4:
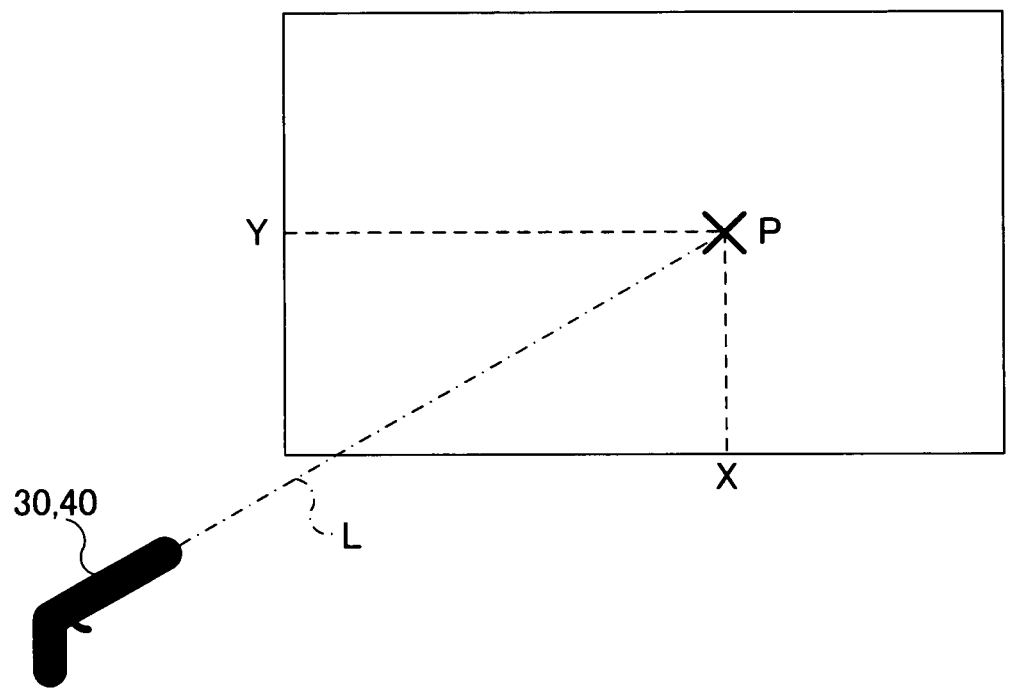
FIG. 4 is an explanatory diagram for describing hit coordinates (X,Y) used in the shooting game device.

Gun board 20 has a CPU 21, ROM 22, and RAM 23. Stored in ROM 22 is a program for calculating hit coordinates, and RAM 23 functions as a work area for CPU 21. As shown in FIG. 4, hit coordinates (X, Y) indicate coordinates of an intersection P where a line L that is an elongation of the axis of the gun barrel intersects a screen plane of first and second display devices 14 and 15. CPU 21 interprets first image data D1 to identify positions of light emitting diodes 51-56, and calculates, on the basis of 6 identified positions, first hit coordinates P1 for a first player. Further, CPU 21, in the same way as for first hit coordinates P1, calculates second hit coordinates P2 based on second image data D2. The calculated results are transferred from CPU 21 to CPU 31 via a bus.

In the above configuration, CPU 11 executes the shooting game program, to thereby display an image on first display device 14 and second display device 15, the image showing a scene of attacking in a virtual space enemies emerging in a defined path and defending against attacks from enemies. CPU 11 sets a first virtual view position for a first player and a second virtual view position for a second player independently from each other, to display a first image of a virtual space at the first player's virtual view position on first display device 14 and a second image of a virtual space at the second player's virtual view position on second display device 15.

Figure 5:
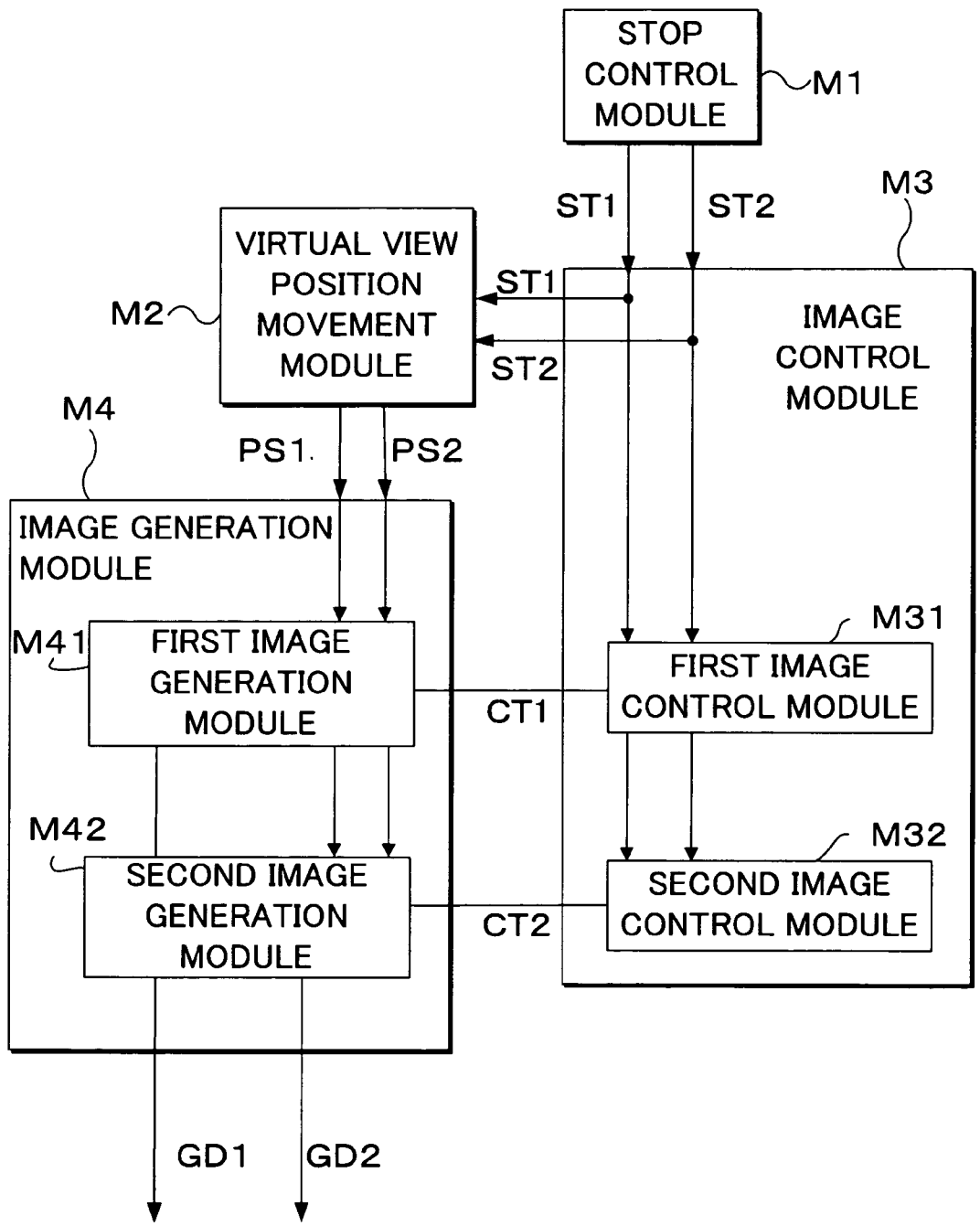
FIG. 5 is an explanatory diagram showing an overview configuration of a shooting game program used in the shooting game device.

FIG. 5 shows an overview configuration of the shooting game program. The shooting game program has a stop control module M1, a virtual view position movement module M2, an image generation module M3, and an image control module M4. The virtual view position movement module M2 causes a first virtual view position and a second virtual view position at a given speed. Specifically, the virtual view position movement module M2 manages first position information PS1 and second position information PS2 independently from each other, the first position information PS1 showing a first virtual view position and the second position information PS2 showing a second virtual view position. First position information PS1 and second position information PS2 are given as a distance of a progress from a reference point in a virtual space. In this example, the reference point is set to a start point of the path in the virtual space.

Stop control module M1 generates first stop information ST1 based on first hit coordinate P1 and second stop information ST2 based on second hit coordinate P2. Specifically, stop control module M1 generates first stop information ST1 in a case that first hit coordinates P1 are out of the screen of first display device 14 and second display device 15, and generates second stop information ST2 in a case that second hit coordinates P2 are located out of the screen of first display device 14 and second display device 15. First hit coordinates P1 and second hit coordinates P2 show directions of the gun barrels of first and second gun units 30 and 40, respectively. Therefore, first stop information ST1 and second stop information ST2 are generated when players points first gun unit 40 and second gun unit 40 out of the screen, respectively.

First stop information ST1 and second stop information ST2 are transmitted via image control module M3 to virtual view position movement module M2. The virtual view position movement module M2 stops, upon receiving first stop information ST1, the movement of a first virtual view position, and stops, upon receiving second stop information ST2, the movement of a second virtual view position.

Image generation module M4 has a function of identifying a position and a direction of a virtual view based on image data of an entire virtual space to generate an image viewed from the virtual view position. Image generation module M4 has a function of compositing an image of a virtual space and a scene image on the basis of control information. Examples of scene images include an image of enemies, an image of a player's partner, an image of the opponent player's character, an image of gunshots, an image of defense, and an image showing damages of enemies, a partner character, and the player's character. The control information specifies types of these scene images and where in a virtual space the scene images are to be positioned.

Image generation module M4 includes a first image generation module M41 and a second image generation module M42. First image generation module M41 generates, as first image GD1, an image of a virtual space at a first virtual view position based on first position information PS1. Second image generation module M42 generates, as first image GD2, an image of a virtual space at a second virtual view position.

Supplied to first image generation module M41 in addition to first position information PS1 is first control information CT1. First control information CT1 can contain positions of enemies, positions of a partner, specifics of gunshots, and specifics of damages of the first player's character. First image generation module M41 refers to first control information CT1 to generate first image GD1 with a scene image composited to a specified position. Second image generation module M42, in the same way as first image generation module M41 does, refers to second control information CT2 to generate a second image GD2 with a scene image composited to a specified position.

Image control module M3 controls image generation module M4 to generate various scene images according to proceedings of a game. Image generation module M4 is so-called an image generation engine and generates an image according to an instruction from image control module M3. Image control module M3 is provided with a first image control module M31 and a second image control module M32. First image control module M31 generates first control information CT1 for controlling first image generation module M41. First image control module M1 compares first position information PS1 and second position information PS2. If a result of the comparison shows that a second virtual view position of a second player leads in the path a first virtual view position of a first player, first image control module M1 generates first control information CT1 for causing an image of the second player to be displayed at a position of second position information PS2, whereby second position information PS2 in addition to first position information PS1 are supplied to first image generation module M41. First image generation module M41 generates first image GD1 containing an image of the second player at a position indicated by second position information PS2. Similarly, second image control module M32 generates second control information CT2 for causing an image of a first player displayed at a position of first position information PS1 in a case that a first player's first virtual view position leads a second player's second virtual view position in the path.

Figure 6:
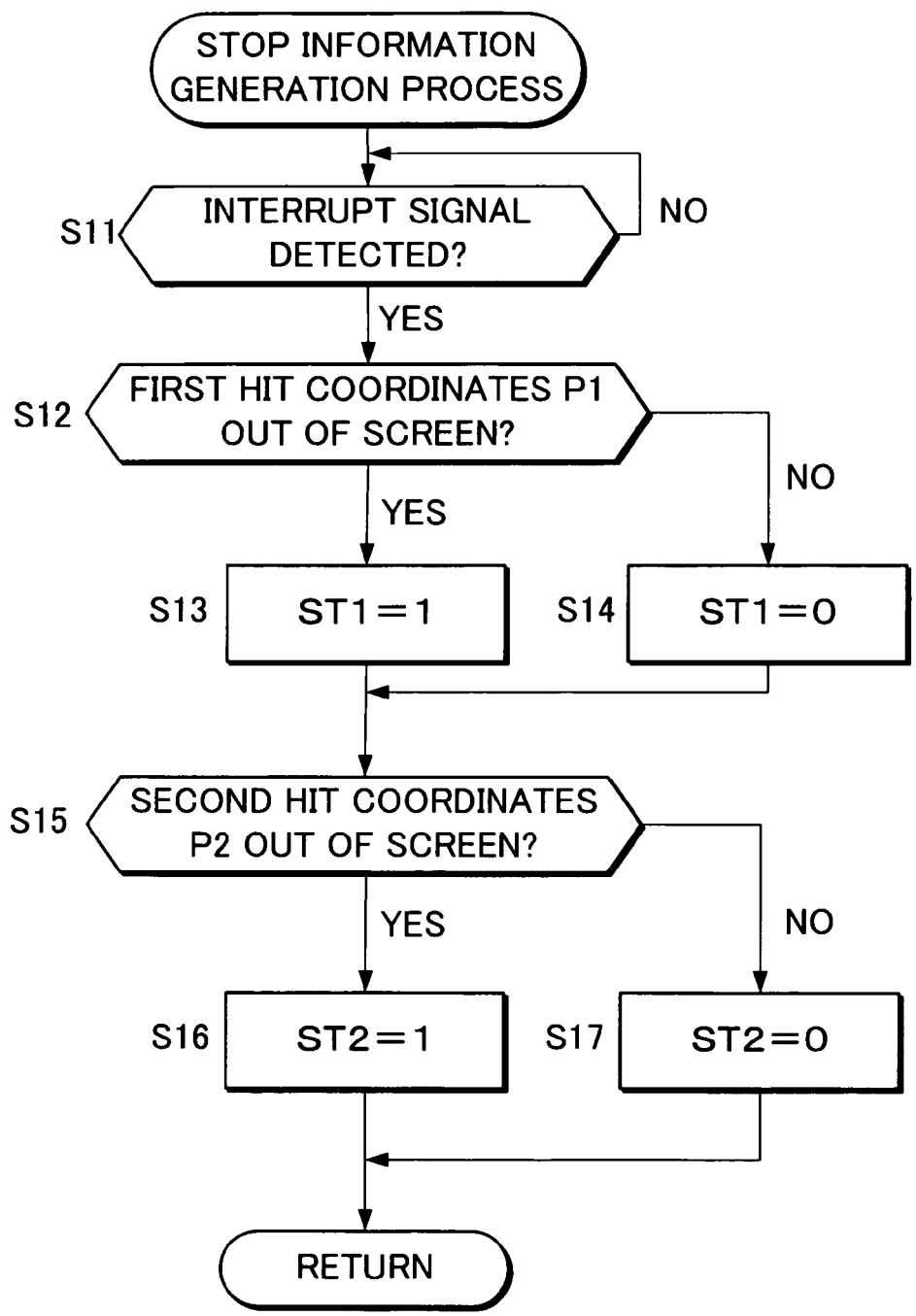
FIG. 6 is a flowchart showing a procedure of a stop control module M1 of the shooting game program.

FIG. 6 is a flowchart showing procedures of stop control module M1. CPU 11 determines whether it has detected an interrupt signal (Step S11), and proceeds to Step S21 in a case that an interrupt signal is detected. An interrupt signal is a signal that occurs at a predetermined interval T. Therefore, a stop information generation process is repeatedly executed at a predetermined interval T.

CPU 11 then determines whether first hit coordinates P1 fall out of a screen (Step S12). The screen is an entire display screen including first display device 14 and second display device 15. It is assumed, for example, that an X coordinate is within a range of 0-N, a Y coordinate is within a range of 0-M if the coordinates are in the display screen, and that first hit coordinates P1 are (X1, Y1). In a case that X1<0, N<X1, Y1<0, or M<Y1, CPU 11 determines that first hit coordinates P1 fall out of the screen. On the other hand, in a case that $0 \leq X1 \leq N$, $0 \leq Y1 \leq M$, CPU 11 determines that first hit coordinates fall in the screen.

Figure 7:
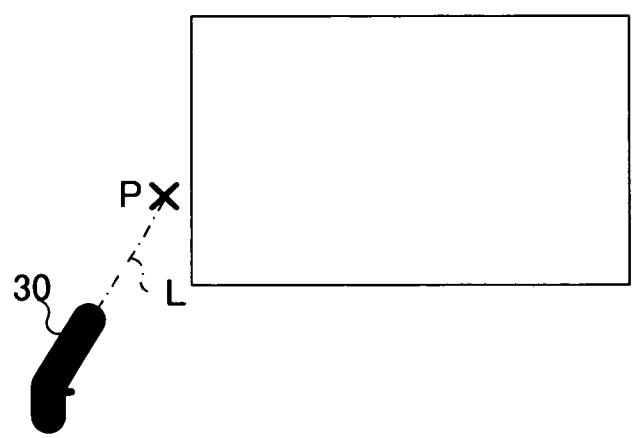
FIG. 7 is an explanatory diagram for describing a state where a first gun unit is pointing out of the screen in the shooting game device.

In a case that a determination result of Step S12 is affirmative, CPU 11 sets "1" as first stop information ST1 (Step S13). On the other hand, in a case that a result of the determination is negative, CPU 11 clears first stop information ST1 to be "0" (Step S14). Thus, CPU 11 is able to know whether a first player points first gun unit 30 out of or to the screen by simply referring to first stop information ST1. For example, in a case that first gun unit 30 points out of the screen as shown in FIG. 7, first stop information ST1 will be set as "1".

CPU 11 next determines whether second hit coordinates fall out of the screen (Step S15). The details of the determination are the same as those of the determination in Step S12. In a case that a result of the determination of Step 15 is affirmative, CPU 11 sets "1" as second stop information ST2 (Step S16). On the other hand, in a case that a result of the determination is negative, CPU 11 clears second stop information ST2 to be "0" (Step S17). Thus, CPU 11 is able to know whether a second player points second gun unit 30 out of or to the screen by simply referring to second stop information ST2.

Figure 8:
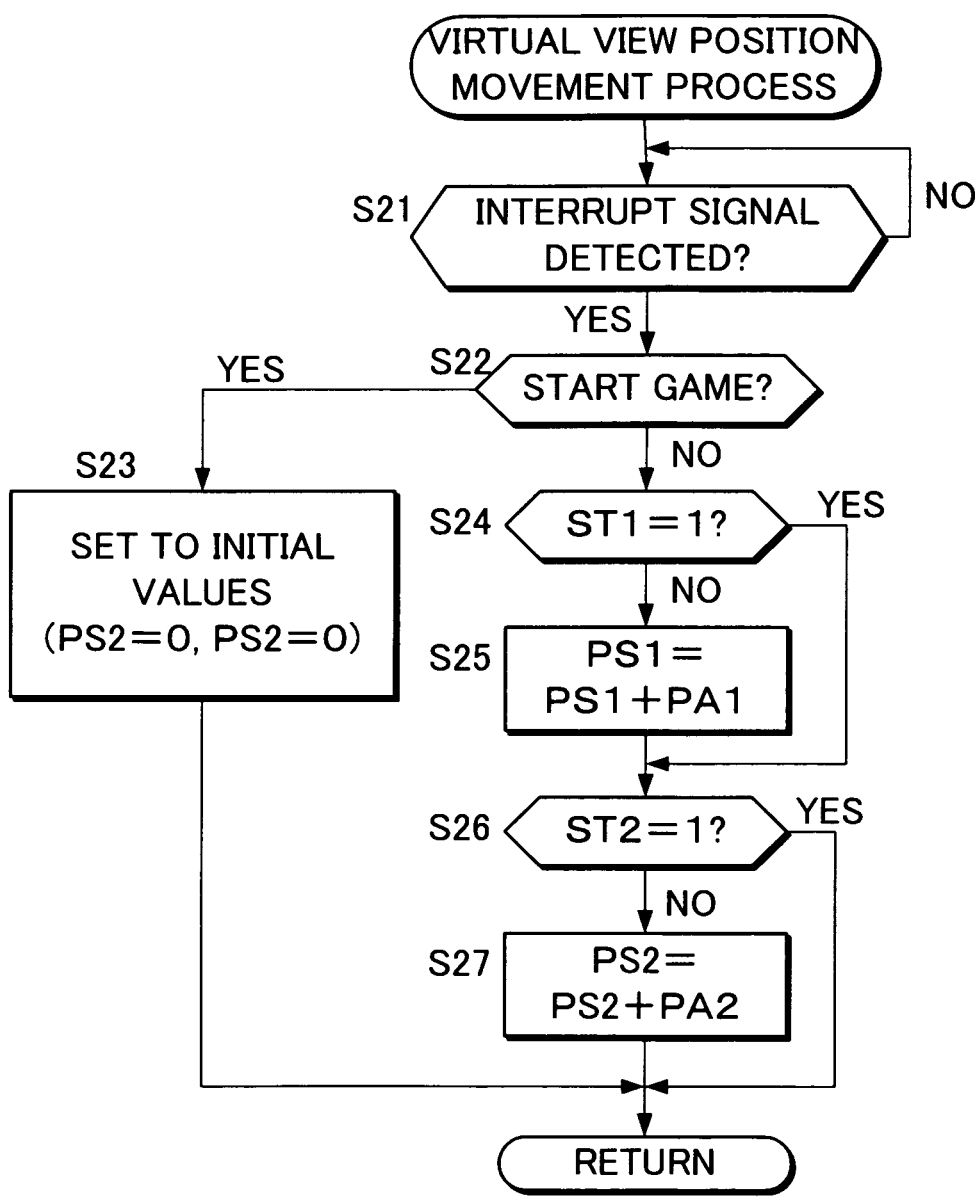
FIG. 8 is a flowchart showing a procedure of a virtual view position movement module M2 of the shooting game program.

FIG. 8 is a flowchart showing procedures of virtual view position movement module M2. CPU 11 determines whether it has detected an interrupt signal (Step S21), and proceeds to Step S21 in a case that an interrupt signal is detected. An interrupt signal is a signal that occurs at a predetermined interval T. Therefore, a virtual view position movement generation process is repeatedly executed at a predetermined interval T.

Subsequently, CPU 11 determines on the basis of a signal supplied from input device 18 whether to start a game (Step S22). CPU 11 determines to start a game in a case that a player inserts a coin and presses down start button 181 or 182. In this case, first and second virtual view positions are set to initial values (Step S23). Specifically, first position information PS1 and second position information PS2 are set to "0". As described above, first position information PS1 and PS2 are distances from a start point. Thus, the first virtual view position and the second virtual view position at the time of starting a game are initially set to a start point of a path created in a virtual space.

In a case that a game has already started, it is determined negative in the determination of Step S22, and CPU 11 proceeds to Step S24. In Step S24, it is determined whether first stop information ST1 equals "1". In a case that first stop information ST1 is "0" but first gun unit 30 points to the display screen, it is determined negative in the determination.

In this case, CPU 11 proceeds to Step S25 to update first position information PS1. Specifically, a predetermined distance PA1 is added to first position information PS1 to obtain a new value of first position information PS1. Since this update process is executed at an interval T, distance PA1 is information specifying a moving speed of the first virtual view position. On the other hand, in a case that a result of the determination of Step S24 is affirmative, a process of Step S25 is omitted. Thus, the updating of first position information PS1 is stopped while a first player points first gun unit 30 out of the screen, and therefore, the movement of the first virtual view position is stopped.

Subsequently, in Step S26, it is determined whether second stop information ST2 equals "1". In a case that second stop information ST2 is "0" but second gun unit 40 points to the display screen, it is determined negative in the determination. In this case, CPU 11 proceeds to Step S27 to update second position information PS2. Specifically, a predetermined distance PA2 is added to second position information PS2 to obtain a new value of second position information PS2. On the other hand, in a case that a result of the determination of Step S26 is affirmative, a process of Step S26 is omitted. Thus, the updating of second position information PS2 is stopped while a second player points second gun unit 40 out of the screen, and therefore, the movement of the second virtual view position is stopped. In this example, distances PA1 and PA2 are set to equal values, distances PA1 and PA2 indicating distances of moving virtual view positions in a time period T.

In a case that first or second stop information ST1 or ST2 indicates that a player is no longer moving, an image of a shield is displayed as a defense image, as will be discussed later. During a period that a shield is displayed, a player's character is not damaged for receiving attacks from enemies. Each player is given scores corresponding to an enemy who each player has eliminated, and bonus points are given to a player who first reaches the end point of the path. Therefore, it is advantageous for a player if s/he takes the lead to other players since the leading player is able to obtain points by encountering more enemies and obtain bonus points by reaching the end point before the other player does. However, the leading player has a higher possibility of being damaged virtually by attacks from enemies. The following player, conversely, has a smaller possibility of virtually receiving attacks from enemies, but the possibility of defeating enemies is also reduced. Thus, a leading player is high-risk, high-return, and a following layer is low-risk, low-return.

In such a match game, it is important to flexibly develop a strategy depending on proceedings of the game such as current scores of the other player and emergences of enemies. For example, if a first player is far ahead in points, the first player does not have to risk his/her character but to let a second player's character to take the lead, by making first gun unit 30 point out of the screen. According to the embodiment, since the movement of a virtual view position can be stopped according to the player's intention, it is possible not only to defeat immediate enemies but also to enjoy using tactics or bargaining in a battle game.

Figure 9:
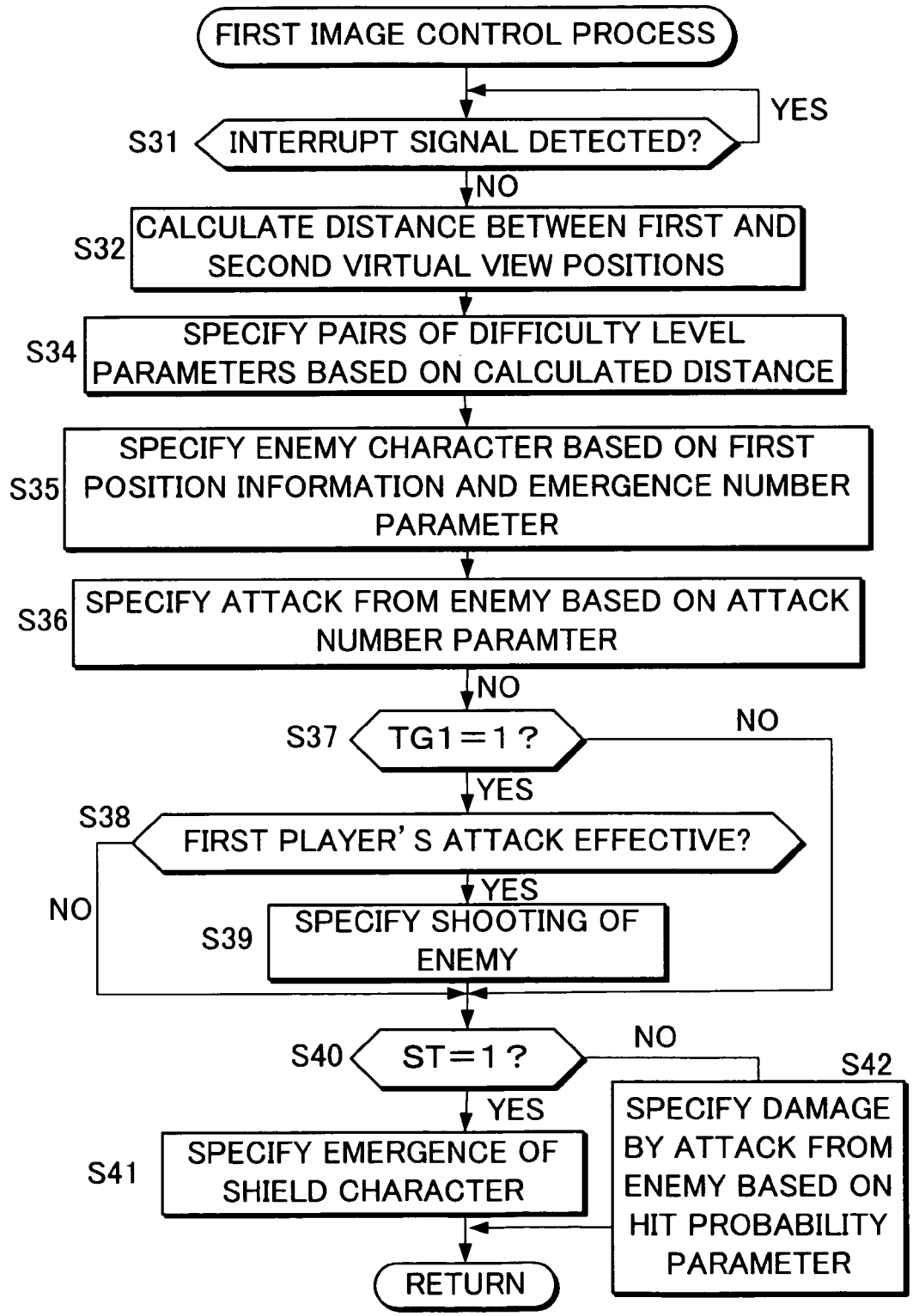
FIG. 9 is a flowchart showing a procedure of a first image control module M31 of the shooting game program.

FIG. 9 is a flowchart showing procedures of first image control module M31. It is to be noted that the procedures of second image control module M32 are the same as those of first image control module 32. CPU 11 determines whether it has detected an interrupt signal (Step S31). The interrupt signal is a signal that occurs at a predetermined interval T. CPU 11, upon detecting an interrupt signal, proceeds to Step S32, and calculates a distance d between a first virtual view position and a second virtual view position on the basis of the first position information and the second position information. CPU 11 then establishes pairs of difficulty level parameters PRM based on the calculated value of distance d (Step S34). A difficulty level parameter PRM is information specifying a level of difficulty (an index of difficulty). CPU 11 refers to a difficulty level table TBL storing distance d between the virtual view positions in association with a pair of difficulty level parameters, to specify various difficulty level parameters PRM.

FIG. 10 shows the details of the difficulty level table TBL. As shown in the figure, difficulty level parameters PRM include the following parameters. An "emergence number" parameter PRM1 specifies a number of emergences of enemies. An "attack number" parameter PRM2 specifies a number of attacks from enemies. A "hit probability" parameter PRM3 specifies a probability of a player's character being shot in attacks from enemies. A "hit area" parameter PRM4 specifies a size of a range of a "hit" occurs through gunshots to enemies. In this example, the distance d is given by d=PS1−PS2. Accordingly, in a case that a first player leads a second player, d is larger than 0 (d>0), and d is smaller than 0 (d<0) in the reverse case. In the table, k1>k2>0, A1>A2>A3>Aref>A4>A5>A6, B1>B2>B3>Aref>B4>B5>B6, C1>C2>C3>Cref>C4>C5>C6, and D6>D5>D4>Dref>D3>D2>D1.

Thus, a level of difficulty for a first player is raised when the first player's virtual view position leads a second player's virtual view position. It is assumed, for example, that the first virtual view position leads the second virtual view position by a distance k2. In this case, the emergence number parameter PRM1 for the first player is A3, while the emergence number parameter PRM2 for the second player is A4. A number of emergences of enemies for the fist player is larger than that for the second player; thus, the level of difficulty is higher for the first player. Conversely, if the first virtual view position follows the second virtual view position by the distance k2, the emergence number parameter PRM1 for the first player is A4, while the emergence number parameter PRM2 for the second player is A3. In this case, the number of emergences of enemies for the first player is smaller than that for the second player, and the difficulty level is lowered. As for the hit area, the size of the hit area of leading player is small, and that of the following player is large.

Figure 11:
FIG. 11 is an explanatory diagram showing another example of details of a difficulty level table used in the shooting game device.

Levels of difficulty are equal for the first and the second players in a case that the virtual view positions for the players are at the same position; a level of difficulty is higher for a leading player; and a level of difficulty for a following player is lower. Since the levels of difficulty are set in such a manner, a following player can readily catch up with a leading player. The best of the battle game is a close battle. Setting a level of difficulty for a following player at a relatively low level enables the creation of a seesaw battle. A difficulty level table TBL shown in FIG. 11 may be used instead of the difficulty level table TBL shown in FIG. 10. In the example, a level of difficulty for a leading player is the same as a case that the virtual view positions for the players are at the same position, but a level of difficulty for a following player is lowered as the distance d becomes larger. In this case, since a level of difficulty for a leading player does not rise, it is possible to give a following player an advantage without having a leading player feel a sense of unfairness for the increase in a number of enemies.

Description will be given again of FIG. 9. When setting difficulty level parameters PRM is completed, CPU 11 generates first control information CT1 that specifies an enemy character based on first position information PS1 and emergence number parameter PRM1 (Step S35). Specifically, CPU 11 refers to an emergence table storing enemy position information designating predetermined emergence positions of enemy characters, to decide presence or absence of an enemy character. In a case that it is determined that an enemy character is present, CPU 11 further generates information specifying enemy characters to emerge as much as a number corresponding to the emergence number set in emergence number parameter PRM1. CPU 11 subsequently sets a number of attacks from enemies based on the attack number parameter PM32 (Step S36).

CPU 11 then determines whether first trigger signal TG1 is "1" (Step S37). When the first player pulls the trigger of first gun unit 30, the first trigger signal TG turns to "1". In a case that a result of the determination of Step S37 is affirmative, CPU 11 determines whether the attack from the first player is effective (Step S38). More specifically, CPU 11 refers to the hit area parameter PRM4 for the first player to specify a hit area of an enemy character, and determines whether hit coordinates P1 fall in the hit area. In a case that the attack turns out to be effective, CPU 11 generates first control information CT1 specifying that an enemy character is shot (Step S39). On the other hand, when the attack is not effective, Step S39 is omitted. In a case that the trigger signal TG1 is "0", no attack has been initiated by the first player, and therefore, steps of S38 and S39 are omitted.

CPU 11 subsequently determines whether first stop information ST1 is "1" (Step S40), and generates first control information CT1 specifying a shield character to appear on the screen (Step S41). The shield character is an item for protecting the player's character against attacks from enemies. As described above, first stop information ST1 being "1" is a state where first gun unit 30 points out of the screen and that the movement of the first player's virtual view position is stopped. As described above, a virtual view position automatically advances in a case that first stop information ST is "0", the first player will get closer to the enemy. If the first player takes on a position of defense by stopping the movement of the virtual view position, the virtual view position of the second player advances in the meantime, and the first player may result in falling behind. It is left to the intention of a player whether to risk advancing the virtual view position without defending with the shield character or to firmly defend with the shield character. Thus, a player's intention is reflected to a game, thereby enhancing the enjoyment of bargaining between players and of competition in a game.

On the other hand, in a case that a result of the determination of Step S40 is negative, CPU 11 specifies that a player's character is damaged in an attack from the enemy based on hit probability parameter PRM3 (Step S42). Specifically, CPU 11 executes a lottery a number of times corresponding to a number of attacks indicated by attack number parameter PRM2, the probability of winning the lottery corresponding to the probability indicated by the hit probability parameter PRM3. In a case that the lottery is won, CPU 11 generates first control information CT1 specifying that the player's character has been damaged. On the other hand, if the lottery is lost, CPU11 does not execute specifying of receiving damage.

Figure 12:
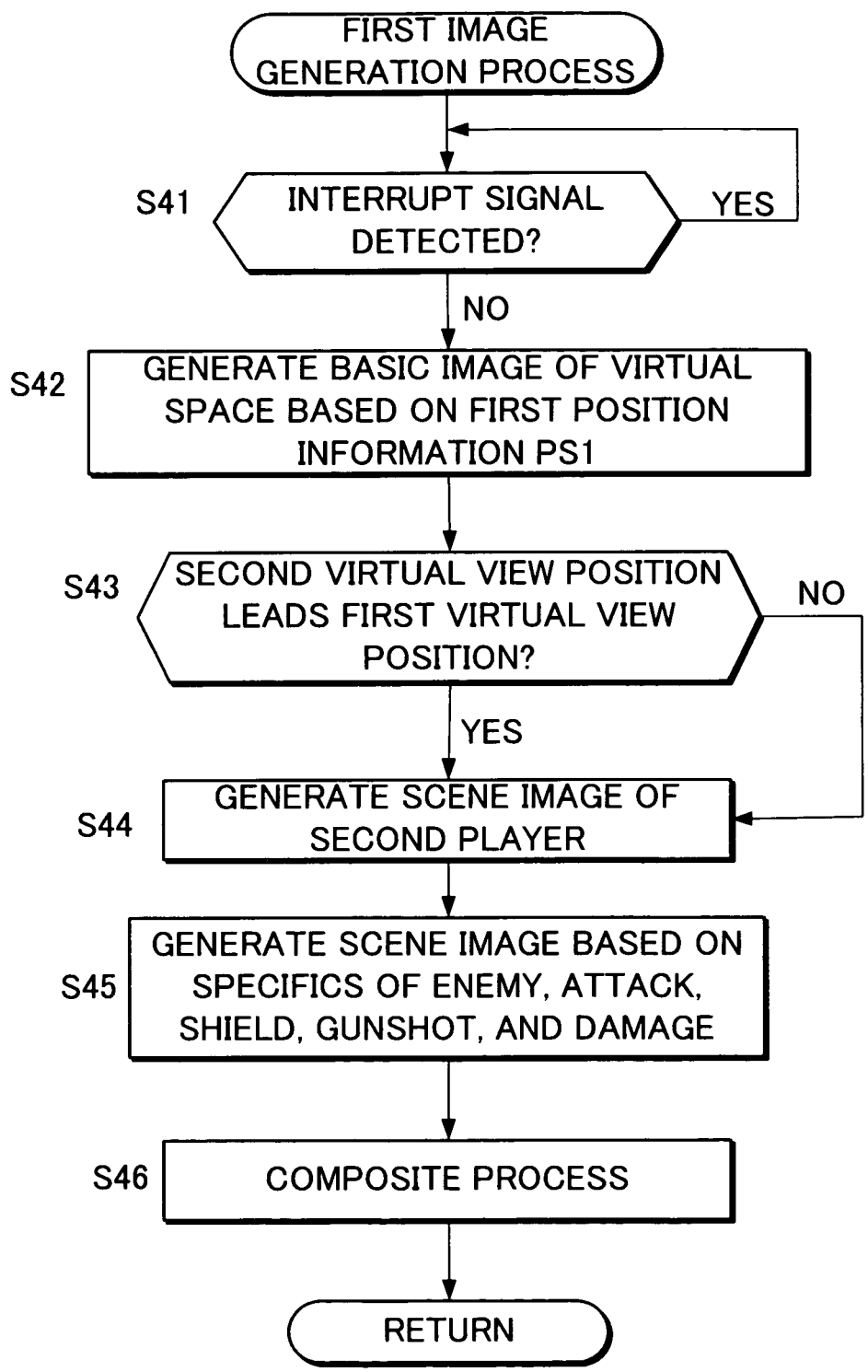
FIG. 12 is a flowchart showing a procedure of a first image generation module M41 of the shooting game program.

FIG. 12 is a flowchart showing procedures of first image generation module M41. The procedures of second image generation module M42 is the same as those of the first image generation module M41 except that the procedures of second image generation module M42 is for a second player. CPU 11 determines whether it has detected an interrupt signal (Step S41), and upon detecting an interrupt signal, proceeds to Step S42. The interrupt signal occurs at the predetermined interval T.

In Step S42, CPU 11 generates, based on first position information PS1, an image of a virtual space at a first virtual view position as a basic image (Step S42). CPU 11 then compares first position information PS1 and second position information PS2, to determine whether the second virtual view position leads the first virtual view position (Step S43).

Figure 13:
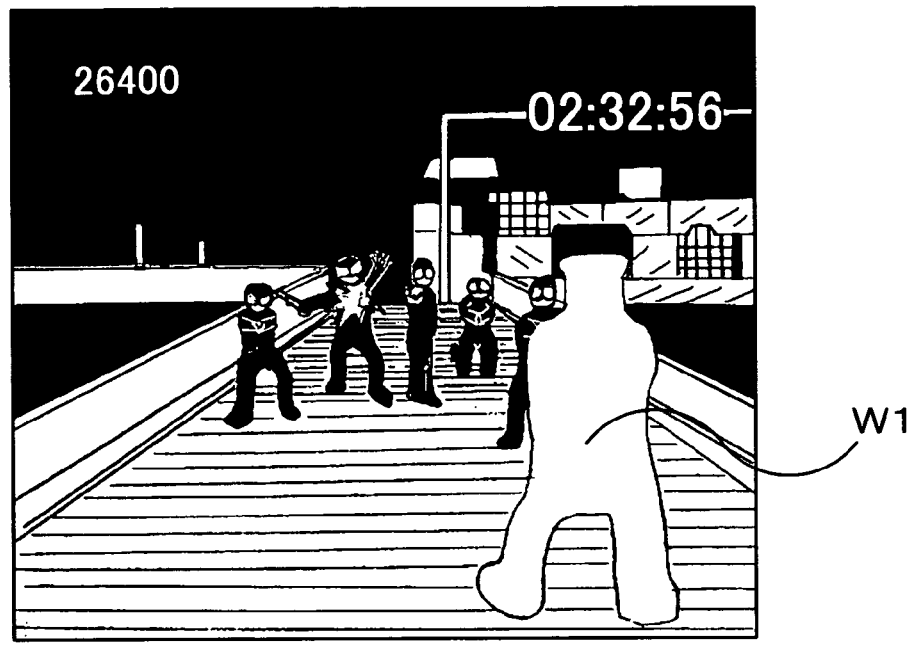
FIG. 13 is an explanatory diagram showing an image for a first player when a second player is leading.
Figure 14:
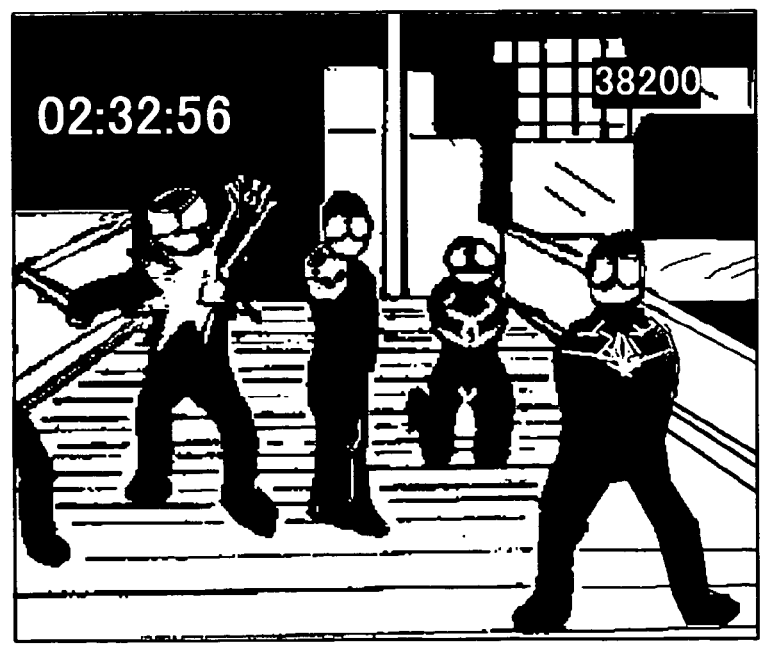
FIG. 14 is an explanatory diagram showing an image for a first player when the first player is leading.

In a case that the second virtual view position leads the first virtual view position, CPU 11 generates a scene image of the second player at the position indicated by second position information PS2 (Step S44). On the other hand, if the first virtual view position leads the second virtual view position, a process of Step S44 is omitted. FIG. 13 shows an image, for the first player, of a case that the second player is taking the lead. In this example, an image W1 of the second player is positioned in front to the right. On the other hand, in a case that the first player is a leading player, an image such as shown in FIG. 14 is generated. In this case, since the second player is positioned behind the first player, an image of the second player is not shown.

Figure 15:
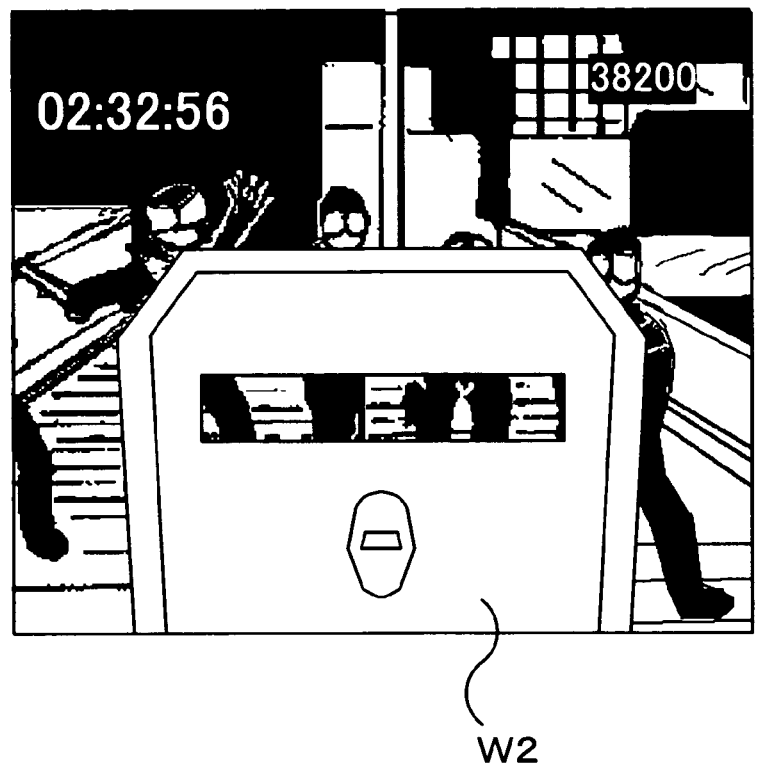
FIG. 15 is an explanatory diagram showing an image of a shield appearing in the shooting game device.

CPU 11 then refers to first control information CT1, and, according to specifics of enemies, attacks, a shield, gunshots, and damages of a player's character, arranges scene images of the specifics. For example, in a case that first control information CT1 indicates that a shield is to appear, an image W2 of a shield is generated as shown in FIG. 15. There is provided a look-through window with the shield in this example so that movements of the enemy can be seen from the window. With this configuration, the first player, while defending with the shield, is able to determine a timing to advance. Further, for example, an image of the damage may be a scene showing that a player's character is dead. If the player's character is a police officer, a demonstration image may be shown of being killed in the line of duty. CPU 11 next composites the scene image with the basic image, to generate first image DS1 (Step S46).

As described in the foregoing, in the present embodiment, since the movement of a virtual view position can be stopped according to the intention of the player, it is possible to provide a shooting game device that allows a player to enjoy the bargaining depending on circumstances of the game. Further, difficulty level parameters PRM are adjusted depending on a distance between a first virtual view position and a second virtual view position, a following player is given chances of changeover.

Figure 16:
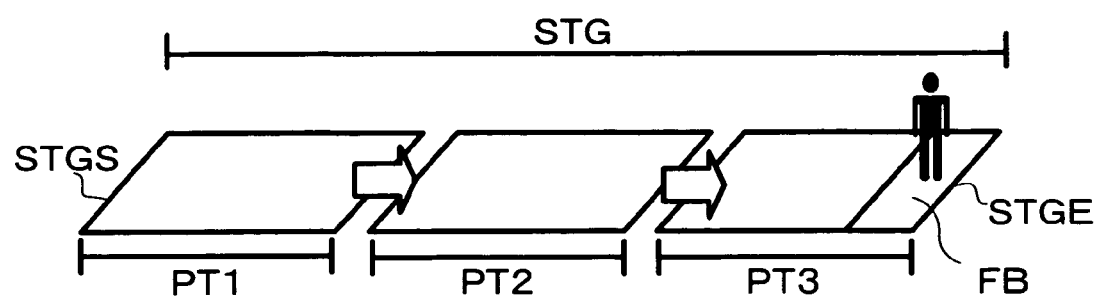
FIG. 16 is an explanatory diagram showing a relationship between a stage and a part according to a modification of a game performed at the shooting game device.

The present invention is not limited to the above embodiment, and modifications such as follows are also possible.
(1) In the above embodiment, the moving speed of the first virtual view position and the second virtual view position are fixed, but the moving speed may be adjusted depending on a distance between the first and the second virtual view positions. In this case, the moving speed of a virtual view position for a following player may be set faster that that for a leading player. Specifically, a distance between a first and a second virtual view positions may be calculated based on first position information PS1 and second position information PS2, so that the speed can be decided depending on the calculated distance. The speed may be decided by adjusting PA1 and PA2 shown in FIG. 8 according to the distance.
(2) In the above embodiment, players compete for a time required for moving from a start point to an end point of a path established in a virtual space. Instead, the start to the end point of a path may be understood as a stage which is a section of a game, and the winner is determined for a part which is a further division of the stage. For example, as shown in FIG. 16, one stage STG (from a stage start point STGS to stage end point STGE) may be divided into three parts PT1-PT3, and it may be determined which player first reaches the end of each part. Bonus points may be given to the winner for each part. Further, at the end of the last part PT3, a boss fight FB for matching a player against a boss who is more powerful than the normal enemy, and special bonus points may be given if the player wins.
(3) In the above embodiment and modifications, a time limit may be provided for reaching an end point since the start of a game. Specifically, CPU 11 starts measuring time since the start of a game, and causes first display device 14 and second display device 15 to display the time measured. CPU 11 then may control proceedings of the game to terminate the game if a player does not reach the end point within the time limit. In a case that a time limit is provided, players would not make it to the end point within the time limit if the both of the players point first and second gun units 30 and 40 out of the screen to stop the movement of virtual view positions for a long period, and therefore, the players are urged to advance by taking risk. Thus, the enjoyment of a game can be enhanced.

Further, in a case that one path is regarded as a stage STG and the stage STG is divided into a plurality of parts PT1, PT2, . . . as described above, a time limit may be extended every time a part is cleared. In this case, an extension time for a following player may be longer than that for a leading player.
(4) In the above embodiment and modifications, attacks from the enemy may include attacks by means of a plurality of types of weapons. For example, two types of attacks may be provided, one being a bullet attack using a gun (a normal attack) and an attack by means of explosive weapons (a specific attack). In this case, both attacks can be defended by a shield, but a virtual view position may be moved backward for a predetermined distance in a case of receiving an attack by explosives.
(5) In the above embodiment and modifications, each player may be assigned a class according to scores. For example, 6 classes: a police officer, a senior police officer, a detective, a senior detective, a police superintendent, and a chief superintendent, may be prepared, so that a player is elevated to a higher class according to scores at the time of clearing the stage. As a result, results of a game may be reflected a character, and the enjoyment of the game is further enhanced.

The invention claimed is:

1. A shooting game device for generating an image of attacking enemies emerging in a defined path and of defending against attacks from said enemies in a virtual space in a shooting game, said shooting game device comprises:

a first input unit for a first player that outputs first operation information in accordance with an operation of the first player;

a second input unit for a second player that outputs second operation information in accordance with an operation of the second player;

a virtual view position mover that moves, from a start point to an end point of said path, a first virtual view position of a first player and a second virtual view position of a second player, to generate first position information showing said first virtual view position and second position information showing said second virtual view position;

an image generator that generates, based on said first position information, a first image at said first virtual view position in the virtual space, for display on a first display screen for said first player, and that generates, based on said second position information, a second image at said second virtual view position in the virtual space, for display on a second display screen for said second player;

a difficulty level specifier that specifies, as a difficulty level parameter, an emergence number parameter specifying a number of times of emergences of said enemies, the difficulty level parameter specifying difficulty of the shooting game;

a difficulty level adjuster that adjusts the emergence number parameter based on said first position information and said second position information so that a first or second number of times of emergences of said enemies for one of the first player and the second player, who is following, is smaller than the first or second number of times of emergences of said enemies for the other of the first player and the second player, who is leading, the first number of times of emergences corresponding to the first player and the second number of times of emergences corresponding to the second player;

a first stopper that generates first stop information when said first operation information indicates a predetermined operation;

a second stopper that generates second stop information when said second operation information indicates the predetermined operation;

a first image controller that controls said image generator to refer to said emergence number parameter for said first player to generate said first image containing a first enemy image representing a first enemy for said first player, that, upon detecting said first stop information, controls said virtual view position mover to stop movement of said first virtual view position and that controls said image generator to generate said first image including a first image of defending against said enemies;

a second image controller that controls said image generator to refer to said emergence number parameter for said second player to generate said second image containing a second enemy image representing a second enemy for said second player, that, upon detecting said second stop information, controls said virtual view position mover to stop movement of said second virtual view position and that controls said image generator to generate said second image including a second image of defending against said enemies; and means for giving scores based on the first enemy the first player has eliminated and the second enemy the second player has eliminated, wherein the virtual view position mover continuously moves the first virtual view position of the first player and the second virtual view position of the second player until the detection of the first stop information and the second stop information, respectively, and wherein the virtual view position mover, the image generator, the difficulty level specifier, the difficulty level adjuster, the first stopper, the second stopper, the first image controller and the second image controller are implemented by one or more processors.

2. The shooting game device of claim 1, wherein said difficulty level adjuster adjusts said difficulty level parameter of said leading player depending on a distance between the first virtual view position and the second virtual view position in the virtual space obtained from said first position information and said second position information, wherein the difficulty level of the first player and the difficulty level of the second player are equal when the distance is equal to zero.

3. The shooting game device of claim 1, wherein said difficulty level parameters include an attack number parameter specifying a number of times of attacks from said enemies;

wherein said difficulty level adjuster adjusts said attack number parameter so that a first or a second number of times of attacks from said enemies for one of the first player and the second player, who is the following player, is smaller than the first or second number of times of attacks from said enemies for the other of the first player and the second player, who is leading, the first number of times of attacks corresponding to the first player and the second number of times of attacks corresponding to the second player;

wherein said first image controller controls said image generator to refer to said attack number parameter for said first player and generate said first image containing a first attack image from enemies for said first player; and wherein said second image controller controls said image generator to refer to said attack number parameter for said second player and generate said second image containing a second attack image from enemies for said second player.

4. The shooting game device of claim 1, wherein said difficulty level parameters include a hit probability parameter specifying a probability of being shot in attacks from said enemies;

wherein said difficulty level adjuster adjusts said hit probability parameter so that a first or second hit probability of being shot in attacks from said enemies for one of the first player and the second player, who is following, is smaller than the first or second hit probability of being shot in attacks from said enemies for the other of the first player and the second player, who is leading, the first hit probability corresponding to the first player and the second hit probability corresponding to the second player;

wherein said first image controller controls said image generator to refer to said hit probability parameter for said first player to generate said first image containing a first damage image of said first player resulting from attacks from enemies; and wherein said second image controller controls said image generator to refer to said hit probability parameter for said second player to generate said second image containing a second damage image of said second player resulting from attacks from enemies.

5. The shooting game device of claim 1, wherein said difficulty level parameters include a hit area parameter specifying a size of a hit area assigned to said enemies for attacks from players;

wherein said difficulty level adjuster adjusts said hit area parameter so that a size of a first or second hit area assigned to said enemies for attacks from one of the first player and the second player, who is following, is larger than a size of the first or second hit area assigned to said enemies for attacks from the other of the first player and the second player, who is leading, the first hit area corresponding to the first player and the second hit area corresponding to the second player, said shooting game device further comprising:

a bullet landing position calculator that calculates a landing position of a bullet on the basis of said first operation information and said second operation information;

a first hit determiner that refers to said hit area parameter for said first player, to specify the size of the first hit area of said enemies for the first player, and that determines whether said landing position for said first player falls in said first hit area; and a second hit determiner that refers to said hit area parameter for said second player, to specify the size of the second hit area of said enemies for the second player, and that determines whether said landing position for said second player falls in said second hit area, wherein said first image controller controls said image generator to refer to a determination result of said first hit determiner to generate said first image containing a first image of said enemies of said first player being shot; and wherein said second image controller controls said image generator to refer to a determination result of said second hit determiner to generate said second image containing a second image of said enemies of said second player being shot.

6. The shooting game device of claim 1, further comprising:

a virtual view position controller that controls said virtual view position mover, based on said first position information and said second position information, so that a moving speed of a first or second virtual view position for one the first player and the second player, who is following, is always faster than a moving speed of the first or second virtual view position for the other of the first player and the second player, who is leading, when both the first player and the second player are moving, the first virtual view position corresponding to the first player and the second virtual view position corresponding to the second player.

7. The shooting game device of claim 1, wherein the first and the second predetermined operations are determined based on a first hit coordinate which indicates where a line L that is an elongation of an axis of a gun barrel of the first gun unit intersects a screen plane of the first display device, and a second hit coordinate which indicates where a line L that is an elongation of an axis of a gun barrel of the second gun unit intersects a screen plane of the second display device.

8. The shooting game device of claim 1, wherein the first input unit is a first gun unit, and, wherein the first stop information is generated when the first player points first gun unit out of the first and second display screen.

9. The shooting game device of claim 8, wherein the second input unit is a second gun unit, and wherein the second stop information is generated when the second player points second gun unit out of the first and second display screen.

* * * * *